United States Patent [19]

Sinclair

[11] 4,045,418
[45] * Aug. 30, 1977

[54] COPOLYMERS OF D,L-LACTIDE AND EPSILON CAPROLACTONE

[75] Inventor: Richard G. Sinclair, Columbus, Ohio

[73] Assignee: Gulf Oil Corporation, Pittsburgh, Pa.

[*] Notice: The portion of the term of this patent subsequent to Aug. 23, 1994, has been disclaimed.

[21] Appl. No.: 544,789

[22] Filed: Jan. 28, 1975

[51] Int. Cl.$^2$ .................... C08G 63/08; C08G 63/10
[52] U.S. Cl. .................... 260/78.3 R; 156/327; 260/9; 260/13; 260/857 R; 260/874
[58] Field of Search ........................ 260/78.3

[56] References Cited

U.S. PATENT DOCUMENTS

| | | | |
|---|---|---|---|
| 2,703,316 | 3/1955 | Schneider | 260/78.3 |
| 2,758,987 | 8/1956 | Salzberg | 260/78.3 |
| 2,890,208 | 6/1959 | Young | 260/78.3 |
| 3,284,417 | 11/1966 | Hostettler et al. | 260/78.3 |
| 3,531,561 | 12/1970 | Trehu | 264/210 |
| 3,636,956 | 1/1972 | Schneider | 128/335.5 |
| 3,736,646 | 6/1973 | Schmitt et al. | 29/458 |
| 3,839,297 | 10/1974 | Wasserman et al. | 260/78.3 |
| 3,844,987 | 10/1974 | Clendinning et al. | 260/7.5 |

FOREIGN PATENT DOCUMENTS

| | | |
|---|---|---|
| 863,673 | 2/1971 | Canada |
| 779,291 | 7/1957 | United Kingdom |

*Primary Examiner*—Harold D. Anderson
*Assistant Examiner*—E. A. Nielsen

[57] ABSTRACT

Copolymers which can be fabricated into films, fibers and structural shapes are prepared by copolymerizing an optically inactive lactide, i.e., D,L-lactide, and epsilon caprolactone in the presence of a tin ester of a carboxylic acid. A copolymer prepared from 85 parts by weight of D,L-lactide and 15 parts by weight of epsilon caprolactone is a thermoplastic elastomer. A copolymer prepared from 90 parts by weight of D,L-lactide and 10 parts by weight of epsilon caprolactone is a rigid, clear, thermoplastic solid.

12 Claims, No Drawings

COPOLYMERS OF D,L-LACTIDE AND EPSILON CAPROLACTONE

BACKGROUND OF THE INVENTION

Thermoplastics are becoming increasingly popular for use in automobiles, housing, appliances, household goods and packaging. Among the materials which have been widely used for such purposes are high- and low-density polyethylene, polyvinyl chloride, polypropylene and polystyrene. While plastics made from these materials have been satisfactory, the raw materials used in their preparation are largely of petroleum origin. Since the demand for petroleum for all uses is ever increasing and since the supply is subject to depletion inventories, attempts are being made to develop thermoplastics from raw materials which are not dependent upon petroleum feedstocks. Also, in view of the growing concern of environmentalists over the disposal of waste materials, attempts are being made to develop thermoplastics which can be made from renewable resources and which are biodegradable to harmless substances. Still further, attempts are being made to develop thermoplastics which, if incinerated, will burn with a clean, blue flame.

Among the raw materials of nonpetroleum origin which have been used to produce thermoplastics are cyclic esters such as glycolide, lactide and the lactones. Glycolide, for example, has been polymerized to produce homopolymers which are reported to be useful in making prosthetic devices. Lactide has been polymerized to produce homopolymers which are reported to be useful in making adhesives, safety glass and finishes. Lactones have been polymerized to produce homopolymers which are reported to be useful in making moldings, coatings, fibers and films. In addition to the formation of homopolymers, the cyclic esters have been interpolymerized to form copolymers including terpolymers. Glycolide, for example, has been copolymerized with lactide and with various lactones to form copolymers which are reported to be useful in making absorbable sutures. Absorbable sutures are also reported to be obtainable when an optically active lactide, e.g., L-(−)-lactide or D-(+)-lactide is copolymerized with optically inactive D,L-lactide and when either L-(−)-lactide, D-(+)-lactide or D,L-lactide is copolymerized with other polymerizable cyclic esters having a 6- to 8-membered ring.

Homopolymers and copolymers of various cyclic esters such as glycolide, lactide and the lactones have been disclosed in numerous patents and scientific publications. See for example, U.S. Pat. Nos. 2,362,511; 2,683,136; 2,758,987; 3,021,309; 3,297,033; 3,463,158; 3,531,561; 3,620,218; 3,636,956; and 3,736,646; Canadian Pat. No. 863,673; British Pat. No. 779,291; German Pat. No. 1,153,902; Collected Papers of Wallace H. Carothers, Vol. 1, Interscience Publishers, Inc., New York (1940); F. J. van Natta et al, Jour. Amer. Chem. Soc. 56, 455 (1934); Ber. Deut. Chem. 36, 1200 (1903); W. H. Carothers et al, Jour. Amer. Chem. Soc. 54, 761 (1932); and K. Chujo et al, Die Makromolekulare Chemi 100, 262-266 (1967). In addition to the above patents and publications, U.S. Pat. No. 2,703,316 to A. K. Schneider, March 1, 1955, POLYMERS OF HIGH MELTING LACTIDE, discloses that lactide homopolymers capable of being formed into tough, orientable, self-supporting thin films can be obtained by heating lactide having a melting point above 120° C. to a temperature above the melting point of the lactide and below 200° C. in the presence of a polyvalent metal oxide such as litharge. The patent to Schneider also discloses that orientable copolymers of lactide can be obtained by heating a mixture of lactide having a melting point above 120° C. with glycolide, with tetramethyl glycolide, and with other polymerizable cyclic esters having a 6- to 8-membered ring (column 5, lines 10–15). According to the patent to Schneider, it is essential that the lactide have a melting point above 120° C. (column 3, lines 50–53). If, for example, a lactide having a melting point of 118° C. is employed, the resulting polymer is reported to be brittle and cannot be formed into drawable films (column 4, lines 58–60). The catalyst is a polyvalent metal oxide or a salt of such a metal, e.g., calcium, titanium, zinc, cadmium, antimony, magnesium and lead.

Canadian Pat. No. 808,731 to R. A. Fouty, Mar. 18, 1969, PREPARATION OF HIGH MOLECULAR WEIGHT POLYLACTIDES, discloses that lactide homopolymers can be obtained by heating L-(−)-lactide, D-(+)-lactide or mixtures thereof at a temperature of 20° to 200° C., preferably 90° to 160° C. in the presence of a divalent Group II metal hydrocarbyl catalyst such as diethylzinc, di-n-butylzinc and diethylmagnesium. The patent to Fouty also discloses that the lactides can be copolymerized with other polymerizable cyclic esters having a 6- to 8-membered ring, e.g., glycolide or tetramethyl glycolide (Page 2, lines 20–23). The polylactides as shown by the general formula in the Fouty patent (Page 1, line 24 and Page 7, line 11) and as described in the patent (Page 8, lines 2–3) contain the Group II metallic component of the catalyst in the form of a lactate. That the metallic component of the catalyst appears in the polylactides in the form of a metallic lactate is considered to be of significance in the preparation of sutures which require a high degree of non-toxicity (Page 8, lines 1–5).

SUMMARY OF THE INVENTION

In accordance with the present invention, thermally stable copolymers of an optically inactive lactide, i.e., D,L-lactide, and epsilon caprolactone are obtained by heating a mixture of D,L-lactide having a melting point above 100° C., for example, about 115° to about 128° C., and epislon caprolactone at a temperature above the melting point of D,L-lactide and below 200° C. in the presence of a catalyst consisting of a tin ester of a carboxylic acid containing up to 18 carbon atoms. The lactide-caprolactone copolymers thus obtained have weight-average molecular weights of 100,000 to 300,000 and can be readily fabricated into highly useful films, fibers and structural shapes having desirable physical properties. The copolymers, depending upon the ratio of lactide to caprolactone employed in the copolymerization, are quite versatile in their physical characteristics ranging from elastomers that are clear, tough and have good strength and modulus to thermoplastics that are clear, tough, strong, tractable and have good form stability and impact resistance. A copolymer prepared from 85 parts by weight of D,L-lactide and 15 parts by weight of epsilon caprolactone is an easily moldable, thermoplastic elastomer having a weight-average molecular weight in excess of 200,000. A copolymer prepared from 90 parts by weight of D,L-lactide and 10 parts by weight of epsilon caprolactone has a weight-average molecular weight in excess of 175,000 and is easily melt-pressed into tough, strong moldings.

The copolymers of D,L-lactide and epsilon caprolactone are insoluble in water but upon constant contact with water are slowly degradable. Thus, throwaway objects made from copolymers of D,L-lactide and epsilon caprolactone are environmentally attractive in that they slowly degrade to harmless substances. If objects made from copolymers of D,L-lactide and epsilon caprolactone are incinerated, they burn with a clean, blue flame.

DETAILED DESCRIPTION OF THE INVENTION

The proportions of D,L-lactide and epsilon caprolactone used in preparing the copolymers in accordance with the invention can vary over a wide range. The exact amount of D,L-lactide and epsilon caprolactone in any given instance will depend upon the properties desired in the ultimate copolymer. Broadly, the concentration of D,L-lactide in the mixture of L-(−)-lactide and epsilon caprolactone which is heated to form copolymers is in the range of about 60 to about 95 weight percent, based on the total weight of the mixture. The concentration of epsilon caprolactone in the mixture of D,L-lactide and epsilon caprolactone which is heated to form the copolymer is in the range of about 40 to about 5 weight percent, based on the total weight of the mixture. When sixty (60) parts by weight of D,L-lactide and forty (40) parts by weight of epsilon caprolactone are used in forming the copolymer, the copolymer has good elongation characteristics and can be easily molded into transparent, colorless, tough, sparkling sheets, but the copolymer is weak and gummy. When the copolymer is formed from 95 parts by weight of D,L-lactide and 5 parts by weight of epsilon caprolactone, the copolymer can be easily molded into colorless, transparent sheets that are strong but the sheets are brittle. The preferred range of D,L-lactide is from about 75 to about 90 weight percent. I have found, quite unexpectedly that a copolymer prepared from 85 parts by weight of D,L-lactide and 15 parts by weight of epsilon caprolactone is a thermoplastic elastomer and that a copolymer prepared from 90 parts by weight of D,L-lactide and 10 parts by weight of epsilon caprolactone is a rigid, clear, thermoplastic solid. Copolymers of D,L-lactide and epsilon caprolactone can be formed when less than 60 percent of D,L-lactide is used. However, the tensile strength, the initial elastic modulus, the shore D harness and the percent rebound of the copolymer decrease with decreasing amounts of D,L-lactide. When more than 95 percent of D,L-lactide is employed in making the copolymer, the tensile strength of the copolymer is high but the impact strength of the copolymer is very low.

For purposes of comparison, an attempt was made to copolymerize D,L-lactide under polymerization conditions of the invention by replacing epsilon caprolactone (a seven-membered ring compound) with other similar cyclic compounds containing three-, five-, six-, seven- and seventeen-membered rings. Thus, an attempt was made to copolymerize D,L-lactide with propylene oxide, gamma butyrolactone, 4-valerolactone, delta valerolactone, epsilon caprolactam and 16-hexadecanolide. Of these three-, five-, six-, seven- and seventeen-membered rings, the only one with which D,L-lactide copolymerized was delta valerolactone. While copolymerization of D,L-lactide and delta valerolactone was effected, the copolymers had a low tensile strength and a weight-average molecular weight below 100,000.

The optically inactive D,L-lactide employed in accordance with the invention is available commercially so that neither the compound per se nor the method by which it is prepared constitutes any portion of the invention. D,L-lactide is a cyclic dimer of D,L-lactic acid. D,L-lactide frequently comprises a mixture of D,D-, L,L- and D,L-lactide. When used herein, the term "D,L-lactide" is intended to include D,L-lactide and mixtures thereof with D,D- and/or L,L-lactide. One of the methods reported in the literature for preparing a lactide is to dehydrate lactic acid under high vacuum. The product is distilled at a high temperature and low pressure. Lactides and their preparation are discussed by W. H. Carothers, G. L. Dorough and M. J. Johnson (J. Am. Chem. Soc. 54, 761–762 [1932]); J. Gay-Lussac and J. Pelouse (Ann. 7, 43 [1833]); C. A. Bischoff and P. Walden (Chem. Ber. 26, 263 [1903]; Ann. 279, 171 [1894]); and Heinrich Byk (Ger. Pat. 267,826 [1912]); through Chem. Abstr. 8, 554, 2034 [1914]). D,L-lactic acid which is used in the preparation of D,L-lactide is available commercially. The D,L-lactic acid can be prepared synthetically by the hydrolysis of lactonitrile (acetaldehyde cyanohydrin) or by direct fermentation of almost any nontoxic carbohydrate product, by-product or waste, utilizing numerous strains of the bacterial genus Lactobacillus, e.g., *Lactobacillus delbrueckii*. D,L-lactide is a white power having a molecular weight of 144. If a commercially available product is employed in accordance with the present invention, I prefer to purify it by recrystallization from anhydrous methyl isobutyl ketone. One such commercially available product comprising a mushy semisolid melting at 90° to 130° C. was recrystallized from methyl isobutyl ketone and decolorized using charcoal. After three such recrystallizations, the product was tumble-dried in vacuo under a nitrogen bleed for 8 to 24 hours at room temperature. The now-white crystals thus obtained comprise a D,L-lactide mixture melting from 115° to 128° C.

The epsilon caprolactone employed in accordance with the invention is available commercially so that neither the compound per se nor the method by which it is obtained constitutes any portion of the invention. According to one method, epsilon caprolactone is prepared by oxidizing cyclohexanone with an anhydrous solution of peracetic acid and acetone. The product thus obtained comprises acetic acid and epsilon caprolactone. When this method is used, it is desirable to add the peracetic acid-acetone solution to an excess of the cyclohexanone, e.g., 5 to 1 molar ratio of cyclohexanone to peracetic acid, in a vessel maintained under reflux. The epsilon caprolactone is recovered from the vessel by conventional distillation. The cyclohexanone used in the preparation of epsilon caprolactone is an intermediate product in the preparation of caprolactam. Cyclohexanone can be obtained either by the hydrogenation of phenol or the oxidation of cyclohexane. If a commercially available epsilon caprolactone is used in accordance with the invention, I prefer to purify the material by vacuum distillation. According to a typical purification procedure, epsilon caprolactone is subjected to distillation in a vacuum distillation column, separately collecting that portion boiling at 56° to 57° C./0.4 torr. Epsilon caprolactone is water-white with a single gas-chromatography peak.

In preparing the D,L-lactide/epsilon caprolactone copolymers in accordance with the invention, it is preferred to carry out the reaction in the liquid phase in a closed, evacuated vessel in the presence of a tin ester of a carboxylic acid containing up to 18 carbon atoms. The copolymers, however, can also be prepared at atmospheric pressure with the polymerization system blanketed by an inert gas such as, for example, nitrogen. If polymerization is conducted in the presence of air, some discoloration occurs with a resulting decrease in molecular weight and tensile strength. The process can be carried out at any temperature between the melting point of D,L-lactide and 200° C. Thus, at atmospheric pressure the temperature can be within the range of about 100° to 200° C. While a temperature below 100° C. can be used in the polymerization reaction if the reactants are dispersed or dissolved in an inert liquid vehicle, the use of such a lower temperature prolongs the copolymerization and may result in less desirable copolymers. Temperature above 200° C. are undesirable because of the tendency of the copolymer to be degraded. Increasing the temperature within the range of 100° to 200° C. generally increases the speed of the polymerization. Good results are obtained by heating a mixture of D,L-lactide and epsilon caprolactone at a temperature between about 100° C. and 160° C.

The catalyst employed in accordance with the invention are tin esters of carboxylic acids containing up to 18 carbon atoms. Examples of such acids are formic, acetic, propionic, butyric, valeric, caproic, caprylic, pelargonic, capric, lauric, myristic, palmitic, stearic and benzoic acids. Good results have been obtained with stannous caprylate.

The catalyst is used in normal catalytic amounts. In general, a catalyst concentration in the range of about 0.001 to about 2 percent by weight, based on the total weight of the D,L-lactide and epsilon caprolactone is suitable. A catalyst concentration in the range of about 0.01 to about 1.0 percent by weight is preferred. I have obtained good results when the catalyst concentration is in the range of about 0.02 to about 0.5 percent by weight. The exact amount of catalyst in any particular case depends to a large extent upon the catalyst employed and the operating variables including time, temperature and pressure.

The reaction time, in most instances, is governed by the other reaction variables including the reaction temperature, the pressure, the particular catalyst, the amount of catalyst and whether a liquid vehicle is employed. The reaction time can vary from a matter of seconds to a period of hours, or days, depending upon the particular set of conditions which are employed. In any event, heating of the mixture of D,L-lactide and epsilon caprolactone is continued until no further evidence of copolymerization is detectable. Whether copolymerization is complete can be determined by analysis for residual monomers.

In general it is preferred to conduct the polymerization in the absence of impurities which contain active hydrogen since the presence of such impurities tends to deactivate the catalyst and/or increase the induction time. It is also preferred to conduct the polymerization under substantially anhydrous conditions.

The copolymers of the invention can be prepared by bulk polymerization, suspension polymerization or solution polymerization. The polymerization can be carried out in the presence of an inert normally-liquid organic vehicle such as, for example, aromatic hydrocarbons, e.g., benzene, toluene, xylene, ethylbenzene and the like; oxygenated organic compounds such as anisole, the dimethyl and diethyl esters of ethylene glycol; normally-liquid saturated hydrocarbons including open chain, cyclic and alkyl-substituted cyclic saturated hydrocarbons such as hexane, heptane, cyclohexane, alkylcyclohexanes, decahydronaphthalene and the like.

The polymerization process can be conducted in a batch, semi-continuous, or continuous manner. The reaction vessel can be any equipment normally employed in the art of making polymers. One suitable vessel, for example, is a glasslined vessel. The monomeric reactants and catalyst can be admixed in any order according to known polymerization techniques. Thus, the catalyst can be added to either of the monomeric reactants. Thereafter, the catalyst-containing monomer can be admixed with the other monomer. In the alternative, the monomeric reactants can be admixed with each other. The catalyst can then be added to the reactant mixture. If desired, the catalyst can be dissolved or suspended in an inert normally-liquid organic vehicle. If desired, the monomeric reactants either as a solution or a suspension in an inert organic vehicle can be added to the catalyst, catalyst solution or catalyst suspension. Still further, the catalyst and the monomeric reactants can be added to a reaction vessel simultaneously. The reaction vessel can be equipped with a conventional heat exchanger and/or a mixing device.

In most instances, copolymerization is substantially complete so that there is no unreacted monomeric material in the polymerization mass. If any monomeric material is present in the polymerization mass, the monomer can be removed, if desired, by conventional methods such as by heating the polymerization mass under a reduced pressure and/or by the utilization of a solvent which is selective for the unreacted monomer.

The copolymers produced in accordance with the present invention depending upon the D,L-lactide/epsilon caprolactone ratio, find utility in the manufacture of films, fibers, moldings and laminates which are prepared by conventional fabricating methods. Filaments, for example, are formed by melt-extruding the copolymer through a spinneret and then drawing the filaments to at least twice their original length to effect orientation and to improve their tensile strength. Films are formed by casting solutions of the copolymers and then removing the solvent or by pressing solid copolymers in a hydraulic press having heated platens.

Various techniques including slow cooling and rapid cooling can be employed in preparing moldings from the copolymers of the invention. In general, slow-cooled moldings have a greater degree of elongation than moldings which are cooled rapidly, sometimes referred to as quenched moldings. On the other hand, quenched moldings have a greater maximum tensile strength and a greater initial modulus than slow-cooled moldings. Thus, the properties of any given product can be altered to some degree by the method of cooling.

The polymers produced in accordance with the invention can be modified, if desired, by replacing a portion of the epsilon caprolactone with another monomer such as, for example, glycolide. The copolymer thus obtained is referred to hereinbelow as a terpolymer and is considered to comprise a macromolecule which contains the three individual monomeric units in an irregular sequence. Normally, the relative numbers of the separate units are not the same in different individual macromolecules or even at different points in a single macromolecule. When glycolide is employed in combination with D,L-lactide and epsilon caprolactone, it can replace up to about 90 percent by weight of the epsilon caprolactone. The terpolymers obtained in copolymerizing D,L-lactide, glycolide and epsilon caprolactone in accordance with the invention have weight ratios of glycolide:epsilon caprolactone within the range of 1:9 to 9:1. Examples of terpolymers obtained in copolymerizing D,L-lactide, glycolide and epsilon caprolactone are as follows wherein the weiight ratios of D,L-lactide/glycolide/epsilon caprolactone, respectively, are 60/5/35; 60/20/30; 60/15/25; 60/20/20; 60/25/15; 60/30/10; 60/35/5; 65/5/30; 65/10/25; 65/15/20; 65/20/15; 65/25/10; 65/30/5; 70/5/25; 70/10/20; 70/15/15; 70/20/10; 70/25/5; 75/5/20; 75/10/15; 75/15/10; 75/20/5; 80/5/15; 80/10/10; 80/15/5; 85/5/10; 85/10/5; 90/1/9; 90/2/8; 90/3/7; 90/4/6; 90/5/5; 90/6/4; 90/7/3; 90/8/2; 90/9/1; 95/1/4; 95/2/3; 95/3/2; and 95/4/1. The polymerization conditions employed when copolymerizing D,L-lactide, glycolide and epsilon caprolactone are the same as those employed when copolymerizing D,L-lactide and epsilon caprolactone.

The copolymers produced in accordance with the present invention can be modified further, if desired, by the addition of a cross-linking agent, a plasticizer, a coloring agent, a filler and the like. A cross-linking agent such as, for example 1,6-hexanediol dimethacrylate, can be employed to give a copolymer which is more resistant to the action of solvents. The cross-linking agent is used in an amount sufficient to improve the solvent resistance of the copolymer. In general, the amount of cross-linking agent is within the range of about 0.1 to 10 percent by weight based on the weight of the copolymer. When a cross-linking agent is employed, a temperature between about 60° and about 150° C., preferably between about 120° and 130° C. is employed for a time sufficient to effect cross-linking. A free-radical source provides curing which improves the strength and specific gravity of normally weak, gummy polymers, and improves the resistance of polymers to the action of a solvent such as benzene. Any of a variety of free-radical agents such as, for example, dibenzoyl peroxide, lauroyl peroxide, t-butyl hydroperoxide,t-butyl perbenzoate and di-t-butyl peroxide can be used. The preferred free-radical agent is dibenzoyl peroxide. In general, the amount of free-radical agent is within the range of about 0.1 to 10 percent based on the weight of the copolymer. When a free-radical agent is employed, curing can be conducted at a temperature between about 60° and about 150° C., preferably between about 120° and about 130° C. for a period of time sufficient to effect the cure. The cure can be effected in one step at a single temperature or in several steps at different temperatures. Curing can be effected at a pressure between about 25 and about 1000 psi preferably between about 25 and about 500 psi. When from 4 to 8 percent by weight of dibenzoyl peroxide is employed as a free-radical agent with a copolymer of D,L-lactide and epsilon caprolactone, compounding, curing and compression molding are readily effected at 120° to 130° C. to give a copolymer that is colorless, transparent and elastomeric.

In preparing moldings, a filler can be incorporated in the copolymer prior to curing. A filler has the function of modifying the properties of a molding including hardness, strength, temperature resistance, etc. Known filler materials include aluminum powder, powdered calcium carbonate, silica, kaolinite (clay), magnesium silicate and the like.

Copolymers prepared according to the present invention can be used in producing reinforced laminates according to known procedures. In general, laminates are made from a fibrous mat or by assembling a multiplicity of sheets of material to form a matrix which is consolidated into a unitary structure by flowing molten polymer through the fibrous material and curing it while in a mold or hydraulic press to form the polymer. Fibers which are used in forming the matrix include natural and synthetic fibers such as cellulose derived from wood, cotton, linen, hemp, and the like, asbestos, glass, nylon, cellulose acetate and the like.

The copolymers of this invention and their preparation are further illustrated by the following specific examples. Examples I to V are directed to the preparation of copolymers of D,L-lactide and epsilon caprolactone containing from 60 to 95 percent by weight of D,L-lactide and 5 to 40 percent by weight of epsilon caprolactone. Example VI is directed to the preparation of a terpolymer wherein 60 percent of the epsilon caprolactone of Example II is replaced by glycolide. The terpolymer thus formed is (75/15/10) D,L-lactide/glycolide/epsilon caprolactone terpolymer having a glycolide:epsilon caprolactone weight ratio of 1.5:1. Example VII is directed to the curing of the 85/15 D,L-lactide/epsilon caprolactone copolymer of Example III. Example VIII does not illustrate the preparation of a copolymer in accordance with the invention. Example VIII is included for comparison purposes with the copolymer of Example II.

EXAMPLE I

[60/40, D,L-Lactide/Epsilon Caprolactone]

60 grams of purified, dry D,L-lactide melting at 115° to 128° C. is placed in a glass ampoule. To the D,L-lactide in the glass ampoule is then added 1 ml of benzene (calcium hydride-dried) containing 0.2 gram of pure stannous caprylate. The ampoule is then evacuated to remove solvent and backflushed with nitrogen. 40 grams of pure epsilon caprolactone distilling at 56° to 57° C./0.35 torr. is then added to the D,L-lactide and catalyst in the ampoule. The contents of the ampoule are thoroughly mixed and degassed. The ampoule is then sealed in vacuo at its constriction by means of a torch. The ampoule and its contents are immersed in an oil heating-bath. The contents of the ampoule are vigorously agitated to provide a homogeneous melt while the melt viscosity is still low. The contents of the ampoule are heated for 1 hour at 135° to 145° C. and then 5 days at 115° to 126° C. The ampoule is allowed to cool to allow the copolymer to solidify. The glass ampoule is then shattered and the glass is removed from the solidified copolymer. The resulting copolymer is a transparent, colorless, weak, tacky material. The product is definitely a copolymer since its properties are distinctly different from a mere physical blend of the two homopolymers of D,L-lactide and epsilon caprolactone. The weight average molecular weight ($\overline{M}_w$) as determined by Gel Permeation Chromatography (GPC) is 154,300. The number average molecular weight ($\overline{M}_n$) is 38,100. The copolymer is melt-formed by conventional thermoplastic techniques into transparent, colorless, tough, sparkling sheets. Physical properties of the copolymer are shown in Table 1.

EXAMPLE II

[75/25, D,L-Lactide/Epsilon Caprolactone]

The procedure of Example I is repeated except that 270 grams of D,L-lactide, 3.6 ml of benzene containing 0.72 gram of stannous caprylate and 90 grams of epsilon caprolactone are placed in the ampoule, evacuated, sealed and heated for 89 hours at 118° to 122° C. The resulting copolymer is a light yellow, transparent, void-free elastomer. The yield of product is 352 grams after removing the glass. The copolymer has GPC molecular weights of $\overline{M}_w = 174,400$ and $\overline{M}_n = 61,500$. The copolymer is easily melt-formed by conventional thermoplastic techniques into clear, sparkling sheets, films and other useful items of commerce. Objects formed from the copolymer are slowly biodegradable.

To illustrate the moldability of this copolymer, the copolymer is cut into small slices on a bale cutter. 50 grams of the sliced copolymer is placed in a 6 inches × 6 inches × 0.75 inches mold preheated to 130° C. The heated copolymer is then compression molded in a Preco Press for 5 minutes at 130° C. Excessive heating and the presence of moisture is to be avoided during molding in order to avoid an adverse affect on the molecular weight of the copolymer. The molded copolymer has GPC molecular weights of $\overline{M}_w = 131,500$ and $\overline{M}_n = 45,100$. Physical properties are listed in more detail in Table 1.

EXAMPLE III

[85/15, D,L-Lactide/Epsilon Caprolactone]

The procedure of Example I is repeated except that 425 grams of D,L-lactide, 75 grams of epsilon caprolactone and 5 ml of benzene containing 1 gram of stannous caprylate are placed in the ampoule, evacuated, sealed and heated for 15 hours at 128° to 130° C. The copolymer has an outstanding combination of physical properties. The copolymer is a clear, nearly colorless, tough solid. No DTA melting points are detectable. It has good impact resistance and a good combination of tensile strength and elongation properties. The copolymer has GPC molecular weights of $\overline{M}_w = 214,300$ and $\overline{M}_n = 34,600$. The residual lactide comprises 1.19 percent. Molded sheets of the copolymer are clear, nearly colorless, supple and tough. Physical properties are listed in more detail in Table 1.

EXAMPLE IV

[90/10, D,L-Lactide/Epsilon Caprolactone]

The procedure of Example I is repeated except that 300 grams of D,L-lactide and 33.3 grams of epsilon caprolactone are melted together in the ampoule. The molten mixture of D,L-lactide and epsilon caprolactone is subjected to agitation to obtain a homogeneous mixture. The homogeneous mixtuure is then cooled. 3.3 ml of benzene containing 0.66 g of stannous caprylate is then added to the cooled mixture in the ampoule. The ampoule is then evacuated, sealed and heated for 86 hours in an oil bath at 105° to 110° C. The copolymer thus obtained is a void-free, colorless, transparent, somewhat brittle material. The copolymer has GPC molecular weights of $\overline{M}_w = 181,300$ and $\overline{M}_n = 63,600$. Physical properties are listed in more detail in Table 1.

EXAMPLE V

[95/5, D,L-Lactide/Epsilon Caprolactone]

The procedure of Example I is repeated except that 95 grams of D,L-lactide, 5 grams of epsilon caprolactone and 1 ml of benzene containing 0.2 gram of stannous caprylate are placed in the ampoule, evacuated, sealed and heated for 5 days at 115° to 145° C. The copolymer thus obtained can be melt-molded easily at 120° C. into colorless, transparent sheets that are strong and brittle. The copolymer has GPC molecular weights before molding of $\overline{M}_w = 136,500$ and $\overline{M}_n = 35,000$. After molding, the GPC molecular weights are: $\overline{M}_w = 76,700$ and $\overline{M}_n = 23,000$. Physical properties are listed in more detail in Table 1.

In Table 1, the designation "ease of molding" summarizes a number of observations on copolymer fabricability. Copolymers rated "excellent" have sufficient melt viscosities over a reasonably broad temperature range to smoothly fill out a mold and stay in place throughout the molding operation. "Ease of molding" also takes into consideration the fact that molding can be performed below the decomposition temperature as noted by the differential thermal analysis (DTA).

TABLE 1

| PROPERTIES OF D,L-LACTIDE/EPSILON CAPROLACTONE COPOLYMERS | | | | | |
|---|---|---|---|---|---|
| Example No. | I | II | III | IV | V |
| D,L-Lactide/Epsilon Caprolactone Wt. Ratio | 60/40 | 75/25 | 85/15 | 90/10 | 95/5 |
| Tensile Strength[a] psi | | | | | |
| At Yield | 65 | 163 | 1555 | 4453 | 5493 |
| At Maximum | 65 | 1300 | 1555 | 4453 | 5493 |
| At 100% Elongation | 63 | 224 | 893 | None | None |
| At 300% Elongation | 43 | 332 | 1041 | None | None |
| At Break | — | 1300 | 1326 | 4453 | 4623 |
| Elongation, percent | | | | | |
| To Yield | — | — | — | 5.6 | — |
| Total | >400 | >600 | >500 | 5.6 | 7.2 |
| Initial Elastic Modulus[a], kpsi | 0.12 | 1.05 | 6.04 | 106 | 135 |
| Impact Strength[b] ft-lb/in. | No Break | No Break | No Break | 3.27 | — |
| Shore D Hardness | 0 | 40 | 79 | 88 | 95 |
| Specific Gravity 20/4[c] | — | 1.200 | 1.220 | 1.240 | — |
| DTA m.p., C | — | None | None | 51, None[d] | — |
| Rebound Test[e] | 11% | 22% | 58% | 51% | 57% |
| Compression Molding Temp, C | — | 82–140 | 82–140 | 82–140 | 120 |
| Ease of Molding | Exc | Exc | Exc | Exc | Exc |

[a]ASTM D-638. (0.06 to 0.08 inch thick) Crosshead Speed:20 in./min.
[b]Izod Impact D-256, without notch.
[c]ASTM D-792
[d]Weak to nondetectable on second evaluation.
[e]ASTM D-2632

It will be noted from the data summarized in Table 1 that the copolymers are sensitive to composition. Weight ratios of D,L-lactide/epsilon caprolactone of 60/40 result in copolymers that are weak, gummy materials although they are easily moldable. Weight ratios of D,L-lactide/epsilon caprolactone of 90/10 to 95/5 result in copolymers that have low-elongations and are brittle. There is a noted change in properties with respect to copolymers prepared from D,L-lactide/epsilon caprolactone in weight ratios of about 75/25. There is a further change in properties when the ratio of D,L-lactide/epsilon caprolactone is 85/15 and higher. For example, the tensile strength of the 75/25 copolymers is markedly improved over the tensile strength of the 60/40 copolymer. Likewise, the tensile strength of 85/15 copolymer is considerably better than tensile strength of the 75/25 copolymer. The tensile strength at "yield" for the 85/15 copolymer is more than nine times greater than that for the 75/25 copolymer. The 90/10 and 95/5 copolymers have greater tensile strengths than the copolymers containing 60 to 85 percent by weight of D,L-lactide, but the 90/10 and 95/5 copolymers are somewhat brittle and have Shore D hardness of 88 and 95, respectively. The initial elastic modulus for the 90/10 and 95/5 copolymers is more than one hundred times that for the 75/25 copolymer and seventeen to twenty-two times that for the 85/15 copolymer. It will be noted with respect to impact strength tht copolymers prepared from D,L-lactide and epsilon caprolactone in weight ratios up to 85/15 (D,L-lactide/epsilon caprolactone) do not break whereas the 90/10 D,L-lactide epsilon caprolcatone copolymer has an impact strength of 3.27. All of the copolymers prepared from 60 to 95 percent by weight of D,L-lactide have excellent molding properties.

The preparation of a terpolymer in accordance with the invention by copolymerizing D,L-lactide, glycolide and epsilon caprolactone is illustrated by Example VI.

EXAMPLE VI

[75/15/10 D,L-Lactide/Glycolide/Epsilon Caprolactone]

In a manner similar to Example II, 75 grams of D,L-lactide, 15 grams of glycolide and 10 grams of epsilon caprolactone is charged into an ampoule with 1 ml (0.2 g/ml) of anhydrous stannous caprylate solution in benzene. The ampoule is degassed and sealed under vacuum. The contents of the ampoule are heated at 118° to 138° C. for 3 days. The terpolymer thus obtained is a white solid which can be compression molded at 100° C. into thin films that are transparent with a slight haze. The films can be folded to a marked degree before breaking. DTA examination of the terpolymer shows no detectable crystallinity or other transitions below the decomposition temperature.

The curing of a copolymer with a free-radical agent (dibenzoyl peroxide) in accordance with the present invention is illustrated by Example VII.

EXAMPLE VII

[Curing an 85/15 D,L-Lactide/Epsilon Caprolactone Copolymer]

100 grams of a copolymer obtained by copolymerizing 85 parts by weight of D,L-lactide with 15 parts by weight of epsilon caprolactone according to the procedure of Example III is blended on a two-roll mill for 15 minutes with 4.1 grams of dibenzoyl peroxide. No external heat is applied to the rolls, and the temperature of working the copolymer remains less than 65° C. The material is a gummy blend and can be pulled apart by hand. A 56-gram portion of the peroxide-copolymer gummy blend is placed in a preheated 6 inches × 6 inches rubber mold and compression molded at 124° C. for 15 minutes. The material which initially flows readily no longer flows. The cured specimens are clear, colorless elastomers. They are insoluble in benzene, swelling to three times original size. The maximum tensile strength of the cured copolymer is 1383. The total elongation of the cured copolymer is greater than 400 percent. The initial elastic modulus for the cured copolyme is 35,400 psi as compared with 6040 psi for the uncured copolymer. Shore D hardness for the cured copolymer is 39 and no break occurs on Izod Impact testing. The cured, elastomeric specimens give a rebound value of 38 percent.

In order to compare a copolymer of the present invention, i.e., a 75/25 copolymer of D,L-lactide/epsilon caprolactone, with other copolymers wherein epsilon caprolactone is replaced by other cyclic compounds containing three-, five-, six-, seven- and seventeen-membered rings, an attempt was made to copolymerize D,L-lactide with propylene oxide, gamma butyrolactone, 4-valerolactone, delta valerolactone, epsilon caprolactam and 16-hexadecanolide. Of these substitutes for epsilon caprolactone, the only one with which D,L-lactide copolymerized under the conditions of the invention was delta valerolactone. This polymerization product had a weight average molecular weight below 80,000. The copolymerization of D,L-lactide and delta valerolactone is shown in Example VIII.

EXAMPLE VIII

[75/25 D,L-Lactide/Delta Valerolactone]

In a manner similar to Example II, 75 grams of D,L-lactide is charged into an ampoule with 1 ml (0.2 g/ml) of anhydrous stannous caprylate solution in benzene. The benzene is removed by evacuating the system. After removal of the benzene, 25 grams of delta valerolactone is added. Following mixing, degassing and sealing of the ampoule, the contents of the ampoule are heated by placing the ampoule in an oil bath at 126° to 138° C. for 24 hours. Examination of the product shows a 97 percent conversion of monomer to polymer. The polymer is a colorless, transparent, weak, pliable copolymer having GPC molecular weights of $\overline{M}_w = 79,200$ and $\overline{M}_n = 30,500$. The maximum tensile strength of the copolymer is 270 psi.

In comparing the copolymer of Example VIII with the copolymer of Example II, it will be observed that the molecular weights and tensile strength of the D,L-lactide/epsilon caprolatone copolymer of Example II are surprisingly superior to the molecular weights and tensile strength of the D,L-lactide/delta valerolactone copolymer of Example VIII.

As disclosd hereinabove, throwaway objects made from copolymers of the present invention are environmentally attractive in that they slowly degrade to harmless substances. All of the copolymers of the present invention degrade in a matter of several hours in boiling water. When placed in a Weather-O-Meter (alternating 30 minutes of light and water at 22° to 49° C.), the copolymers become tacky after overnight exposure. When subjected to prolonged exposure at a constant temperature 72° F. [22.2° C.] and humidity (50%), copolymers of the present invention show a marked change in physical characteristics. The "before exposure" and "after exposure" physical characteristics of sheets of copolymers of Examples II, III and IV are shown in Table 2.

TABLE 2

PROPERTIES OF D,L-LACTIDE/EPSILON CAPROLACTONE COPOLYMERS
(Before and After 4 Months at 72° F. [22.2° C.], 50% Relative Humidity)

| Example No. | II | | III | | IV | |
|---|---|---|---|---|---|---|
| D,L-Lactide/Epsilon Caprolactone Wt. Ratio | 75/25 | | 85/15 | | 90/10 | |
| Property | Before | After | Before | After | Before | After |
| Tensile Strength[a], psi | | | | | | |
| At Maximum | 1300 | 119 | 1555 | 906 | 4453 | 1870 |
| At 100% Elongation | 224 | 118 | 893 | 365 | None | 1364 |
| At 300% Elongation | 332 | 116 | 1041 | 700 | None | 1445 |
| Elongation, percent | | | | | | |
| To Yield | >600 | 820 | >500 | 410 | 5.6 | 350 |
| To Failure | — | 820 | >500 | 410 | — | — |
| Initial Elastic Modulus[a], psi | 1050 | 374 | 6044 | 2600 | 106,000 | 41,000 |
| Shore D Hardness | 40 | 21 | 79 | 54 | 90 | 86 |

[a]ASTM D-638. (0.06 to 0.08 inch thick)
Crosshead Speed: 20 in./min.

It will be noted from the data summarized in Table 2 that the copolymers of the invention are sensitive to ambient moisture. When copolymers were prepared from 75 to 90 parts by weight of D,L-lactide and 10 to 25 parts by weight of epsilon caprolactone, they encountered drastic changes in their physical properties after 4-months exposure at a constant temperature of 72° F. (22.2° C.) and 50 percent relative humidity.

The copolymers of the present invention are versatile in properties depending upon the weight ratio of monomers in the macromolecules. As a result, the copolymers of the invention are useful in manufacturing a variety of materials varying from gummy adhesives to self-supporting rigid objects for automobiles, housing, appliances, household goods, packaging and the like.

While my invention has been described above with reference to various specific examples and embodiments, it will be understood that the invention is not limited to such illustrated examples and embodiments and may be variously practiced within the scope of the claims hereinafter made.

I claim:

1. A thermally stable copolymer of an optically inactive lactide and epsilon caprolactone, said copolymer being obtained by heating a mixture of L,L-lactide having a melting point above 100° C. and epsilon caprolactone at a temperature above the melting point of D,L-lactide and below 200° C. in the presence of a catalyst, said mixture comprising about 60 to about 95 per cent by weight of D,L-lactide.

2. A thermally stable copolymer in accordance with claim 1 wherein said mixture comprises about 75 to about 90 percent by weight of D,L-lactide.

3. A thermoplastic elastomer of an optically inactive lactide and epsilon caprolactone, said elastomer being obtained by heating 85 parts by weight of D,L-lactide having a melting point above 100° C. and 15 parts by weight of epsilon caprolactone at a temperature above the melting point of D,L-lactide and below 200° C. in the presence of a tin ester of a carboxylic acid containing up to 18 carbon atoms.

4. A thermoplastic elastomer in accordance with claim 3 wherein the D,L-lactide and epsilon caprolactone are heated at about 125° to about 130° C.

5. A rigid, clear, thermoplastic solid of an optically inactive lactide and epsilon caprolactone, said solid being obtained by heating 90 parts by weight of D,L-lactide having a melting point above 100° C. and 10 parts by weight of epsilon caprolactone at a temperature above the melting pont of D,L-lactide and below 200° C. in the presence of a tin ester of a carboxylic acid containing up to 18 carbon atoms.

6. A rigid, clear, thermoplastic solid in accordance with claim 5 wherein the D,L-lactide and epsilon caprolactone are heated at about 105° to about 110° C.

7. A thermally stable copolymer in accordance with claim 1 wherein said catalyst is a tin ester of a carboxylic acid containing up to 18 carbon atoms.

8. A terpolymer of an optically inactive lactide, glycolide and epsilon caprolactone, said terpolymer being obtained by heating a mixture of D,L-lactide having a melting point above 100° C., glycolide and epsilon caprolactone at a temperature above the melting point of D,L-lactide and below 200° C. in the presence of about 0.001 to about 2 percent by weight, based on the total weight of the D,L-lactide, glycolide and epsilon caprolatone, of catalyst, said mixture comprising about 60 to about 95 percent by weight of D,L-lactide and about 5 to about 40 percent by weight of glycolide and epsilon caprolactone, the weight ratio of glycolide-:epsilon caprolactone being within the range of 1:9 to 9:1.

9. A terpolymer in accordance with claim 8 wherein the D,L-lactide, glycolide and epsilon caprolactone are heated at about 100° to about 160° C.

10. A terpolymer in accordance with claim 9 wherein said mixture of D,L-lactide, glycolide and epsilon caprolactone comprises about 75 percent by weight of D,L-lactide and about 25 percent by weight of glycolide and epsilon caprolactone.

11. A terpolymer in accordance with claim 10 wherein the D,L-lactide, glycolide and epsilon caprolactone are heated at about 118° to 138° C. and the weight ratio of glycolide:epsilon caprolactone is 3:2.

12. A terpolymer in accordance with claim 8 in which said catalyst is a tin ester of a carboxylic acid containing up to 18 carbon atoms.

* * * * *